(12) United States Patent
Jensen et al.

(10) Patent No.: US 7,515,673 B2
(45) Date of Patent: Apr. 7, 2009

(54) METHOD AND APPARATUS FOR REPAIRING A JET PUMP DIFFUSER ADAPTER TO TAILPIPE WELD

(75) Inventors: Grant C. Jensen, Morgan Hill, CA (US); Siamak Bourbour, San Jose, CA (US)

(73) Assignee: General Electric Company, Schenectady, NY (US)

(*) Notice: Subject to any disclaimer, the term of this patent is extended or adjusted under 35 U.S.C. 154(b) by 74 days.

(21) Appl. No.: 11/638,463

(22) Filed: Dec. 14, 2006

(65) Prior Publication Data

US 2008/0144761 A1  Jun. 19, 2008

(51) Int. Cl.
G21C 9/00 (2006.01)
(52) U.S. Cl. ............... 376/303; 376/302; 376/372; 376/407
(58) Field of Classification Search ............ 376/303, 376/302, 372, 407
See application file for complete search history.

(56) References Cited

U.S. PATENT DOCUMENTS

| | | | |
|---|---|---|---|
| 3,144,165 A * | 8/1964 | Pegon et al. ............... 220/211 |
| 3,310,329 A * | 3/1967 | Luker ................... 292/256.69 |
| 4,619,447 A * | 10/1986 | Blake ......................... 269/221 |
| 4,632,221 A * | 12/1986 | Stanford ................. 182/186.8 |
| 4,709,729 A * | 12/1987 | Harrison ....................... 138/99 |
| 5,345,484 A | 9/1994 | Deaver et al. |
| 5,443,246 A * | 8/1995 | Peterson ..................... 269/283 |
| 5,521,951 A | 5/1996 | Charnley et al. |
| 5,530,219 A | 6/1996 | Offer et al. |
| 5,602,887 A | 2/1997 | Jensen |
| 5,623,525 A | 4/1997 | Jensen |
| 5,642,955 A | 7/1997 | Jensen |
| 5,646,969 A | 7/1997 | Jensen |
| 5,675,619 A | 10/1997 | Erbes et al. |
| 5,699,397 A | 12/1997 | Jensen |
| 5,707,089 A * | 1/1998 | Fend ........................... 285/411 |
| 5,785,361 A | 7/1998 | Bourbour et al. |
| 5,785,447 A * | 7/1998 | Fonti et al. .................... 403/49 |
| 5,803,686 A | 9/1998 | Erbes et al. |
| 5,905,771 A | 5/1999 | Erbes et al. |
| 5,908,210 A * | 6/1999 | Fetzer .......................... 285/24 |
| 6,029,964 A * | 2/2000 | Bohl .............................. 269/6 |
| 6,053,652 A | 4/2000 | Deaver et al. |
| 6,086,120 A | 7/2000 | Deaver et al. |
| 6,108,391 A | 8/2000 | Deaver et al. |
| 6,373,019 B1 | 4/2002 | Offer et al. |
| 6,375,130 B1 | 4/2002 | Jensen et al. |
| 6,375,230 B1 | 4/2002 | Jensen et al. |
| 6,417,476 B1 | 7/2002 | Offer et al. |
| 6,456,682 B1 | 9/2002 | Jensen |

(Continued)

Primary Examiner—Rick Palabrica
(74) Attorney, Agent, or Firm—Nixon & Vanderhye P.C.

(57) ABSTRACT

A clamp assembly connects a diffuser adapter or lower ring to a diffuser tail pipe of a jet pump diffuser in a boiling water nuclear reactor. The clamp assembly includes at least two clamp segments shaped generally corresponding to an exterior circumference of the diffuser, a swivel link affixed at each end of each of the clamp segments, and at least two connecting bands pivotably secured to the swivel links between the ends of the clamp segments. The clamp segments each includes a locking assembly engageable with the diffuser adapter or lower ring and the diffuser tail pipe. The clamp assembly structurally replaces/repairs the weld joining the diffuser adapter or lower ring and the diffuser tail pipe.

11 Claims, 7 Drawing Sheets

U.S. PATENT DOCUMENTS

| | | | |
|---|---|---|---|
| 6,575,652 B2 * | 6/2003 | Krauss | 403/49 |
| 6,647,083 B1 | 11/2003 | Jensen | |
| 6,857,814 B2 | 2/2005 | Jensen | |
| 6,889,889 B2 | 5/2005 | Offer et al. | |
| 2008/0107227 A1 * | 5/2008 | Koepke | 376/302 |

* cited by examiner

METHOD AND APPARATUS FOR REPAIRING A JET PUMP DIFFUSER ADAPTER TO TAILPIPE WELD

BACKGROUND OF THE INVENTION

The invention relates to repairing or replacing a bimetallic weld in a jet pump diffuser assembly and, more particularly, to a jet pump diffuser clamping assembly that structurally replaces/repairs the weld.

In a boiling water nuclear reactor, hollow tubular jet pumps positioned within the shroud annulus provide the required reactor core flow. The lower portion of the jet pump is a long conical tubular section. The function of the diffuser is to slow the high velocity flow stream and thus convert the dynamic head of the flow stream into static pressure.

The jet pump diffuser assemblies in boiling water reactors can be one of two differing design configurations. The first configuration incorporates an adapter component, which is comprised of an upper austenitic stainless steel ring and a lower inconel alloy 600 ring. These two rings were shop-welded, as this was a bimetallic weld (a weld of dissimilar metals) and more difficult to perform than a weld joining similar metals. This adapter component then facilitated the assembly of the diffuser in the reactor, as the lower section of the adapter was welded to the inconel alloy 600 shroud support plate. The diffuser tail pipe being constructed of austenitic stainless steel was then joined to the upper section of the adapter, which was constructed of austenitic stainless steel. As such, at the time of field construction of the reactor these two welds of similar metals were performed.

The second design configuration consists of a lower ring constructed of inconel alloy 600, shop-welded to the diffuser tail pipe. Since the diffuser tail pipe is fabricated from austenitic stainless steel, this was a bimetallic weld. This design approach results in the welding of the lower ring to the shroud support plate as the only weld required to be performed at the time of field construction of the reactor.

Regardless of diffuser assembly design configuration under consideration, a bimetallic weld is present in the diffuser assembly. In the event that the structural integrity of the bimetallic weld of the diffuser assembly should become degraded, a means of reinforcing or structurally replacing this weld is desired.

BRIEF DESCRIPTION OF THE INVENTION

In an exemplary embodiment of the invention, a clamp assembly connects a diffuser adapter or lower ring to a diffuser tail pipe of a jet pump diffuser in a boiling water nuclear reactor. The clamp assembly includes at least two clamp segments shaped generally corresponding to an exterior circumference of the diffuser, a swivel link affixed at each end of each of the clamp segments, and at least two connecting bands pivotably secured to the swivel links between the ends of the clamp segments. The clamp segments each includes a locking assembly engageable with the diffuser adapter or lower ring and the diffuser tail pipe.

In another exemplary embodiment of the invention, a method of repairing a weld joining a diffuser adapter or lower ring to a diffuser tail pipe of a jet pump diffuser in a boiling water nuclear reactor includes the steps of forming a plurality of holes in the diffuser adapter or lower ring and the diffuser tail pipe; positioning two clamp segments each including a clamp body and upper and lower pin inserts on the diffuser such that the upper pin inserts engage the holes in the diffuser tail pipe and such that the lower pin inserts engage the holes in the diffuser adapter or lower ring; connecting a swivel link at each end of each of the clamp segments; securing two connecting bands to the swivel links between the ends of the clamp segments; and tightening the connection between the clamp segments and the swivel links to ensure proper fit-up and substantially equal distribution of loads.

In still another exemplary embodiment of the invention, the clamp assembly includes two clamp segments shaped generally corresponding to an exterior circumference of the diffuser. Each clamp segment includes a clamp body housing an upper pin insert and a lower pin insert. The upper and lower pin inserts have pins engageable with corresponding holes formed in the diffuser adapter or lower ring and the diffuser tail pipe. A swivel link is affixed at each end of each of the clamp segments, and at least two connecting bands are pivotably secured to the swivel links between the ends of the clamp segments.

DETAILED DESCRIPTION OF THE INVENTION

Figure 1:
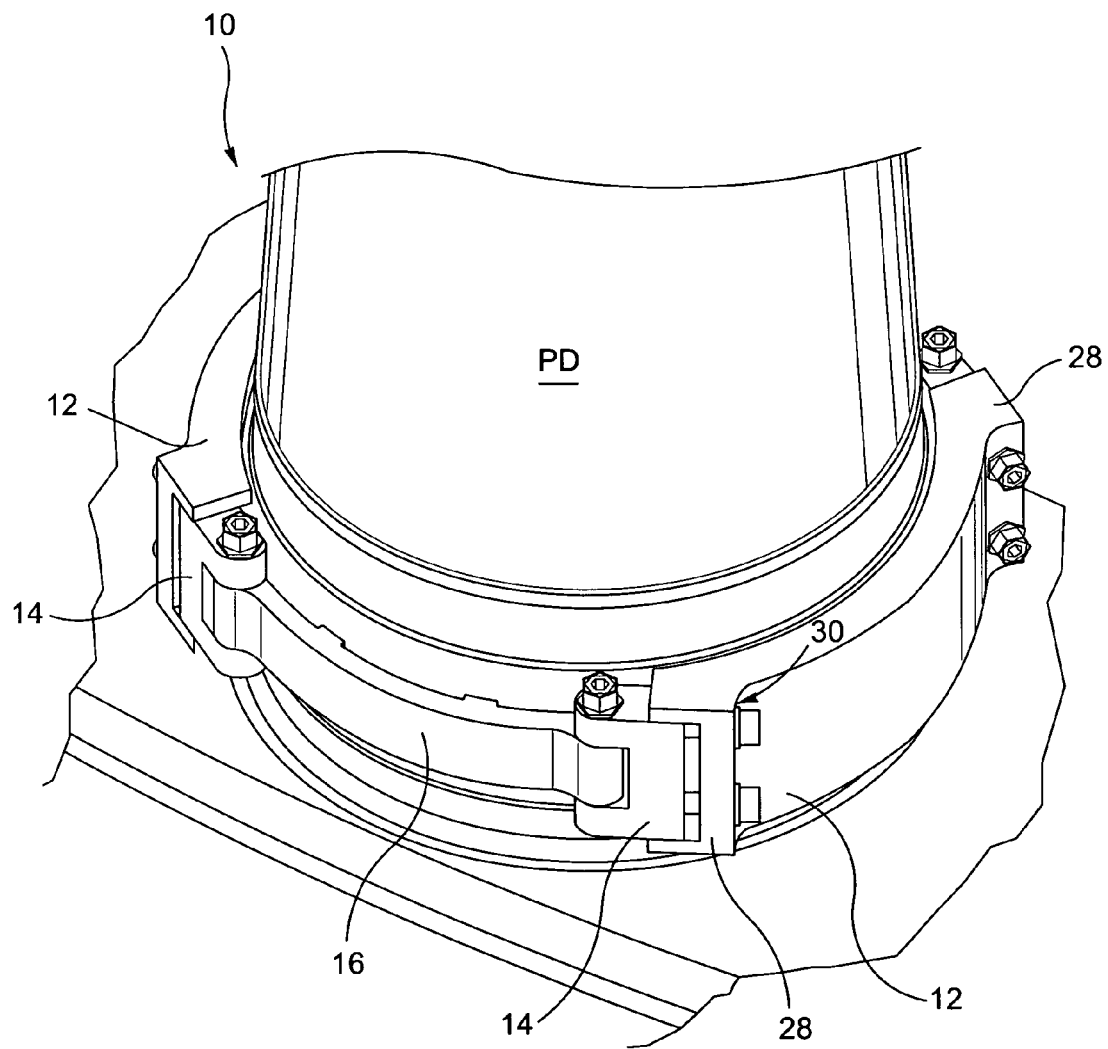
FIG. 1 is an isometric view of the clamp assembly affixed to a jet pump diffuser.
Figure 2:
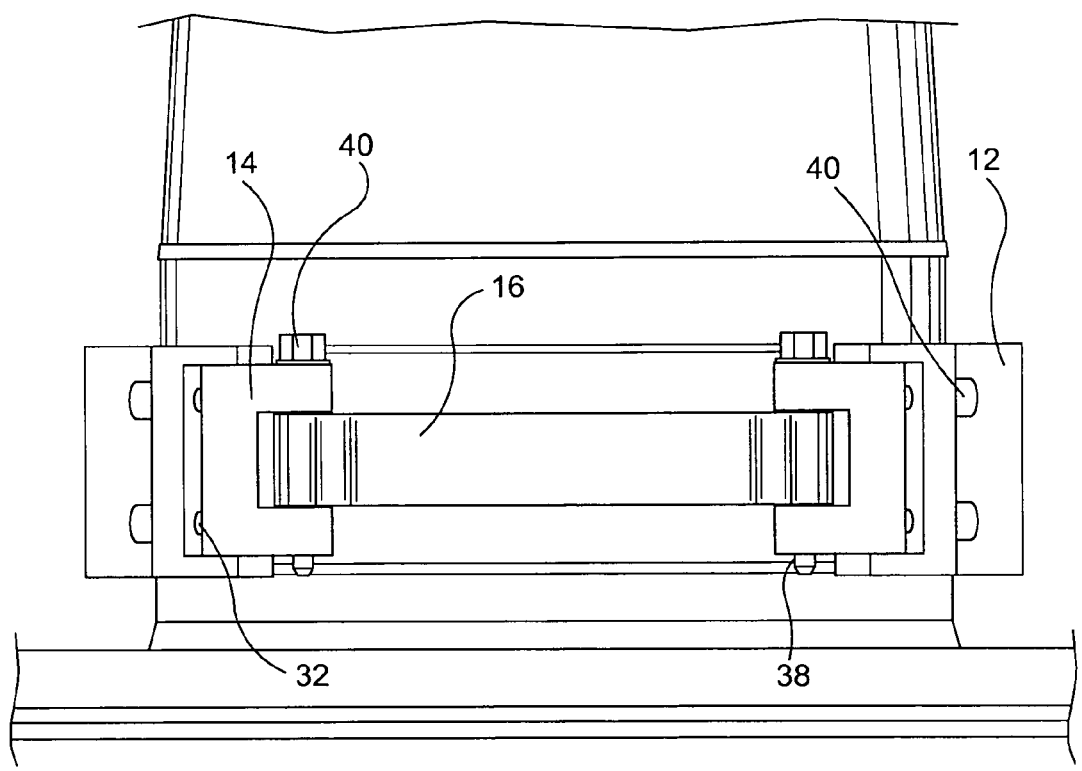
FIG. 2 is an elevation view of the clamp assembly in FIG. 1.
Figure 3:
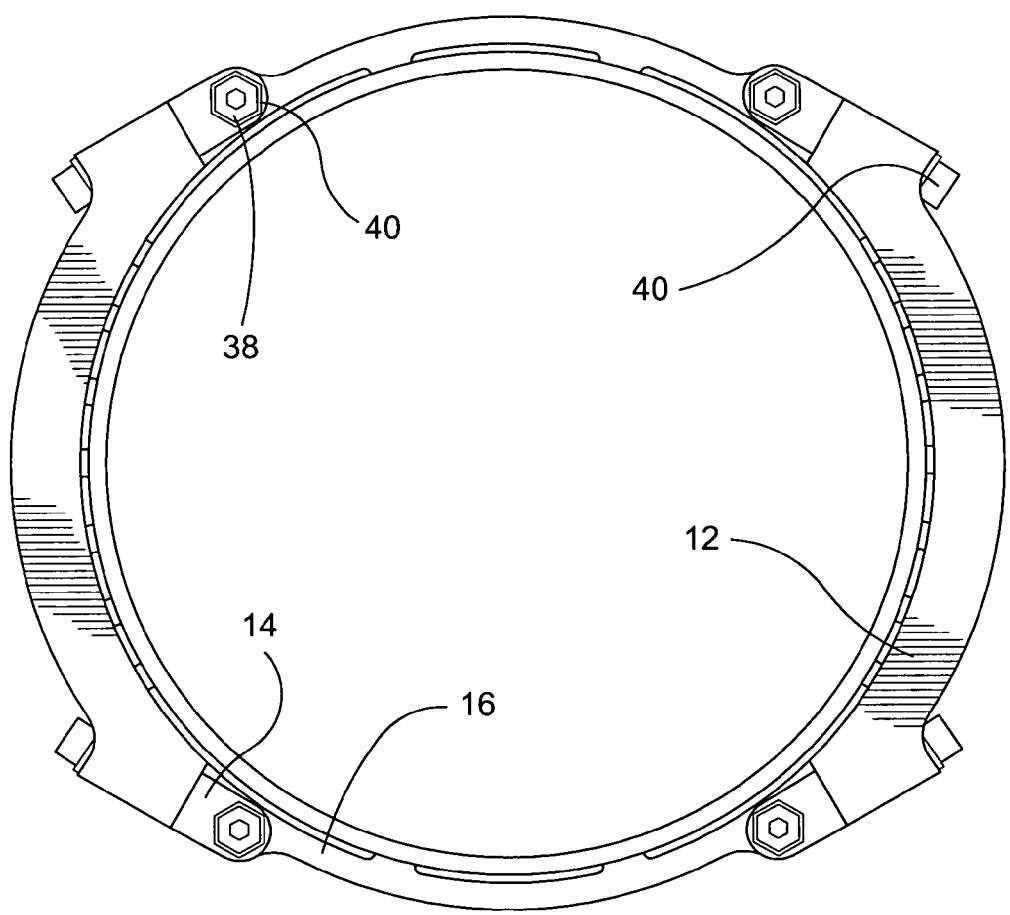
FIG. 3 is a plan view of the clamp assembly.

The jet pump diffuser clamp assembly 10 is shown installed on a jet pump diffuser PD in FIGS. 1-3. Components of the clamp assembly 10 include clamp segments 12 shaped generally corresponding to an exterior circumference of the diffuser PD, swivel links 14 affixed at each end of the clamp segments 12, and connecting bands 16 pivotably secured to the swivel links 14 between the ends of the clamp segments 12.

Figure 4:
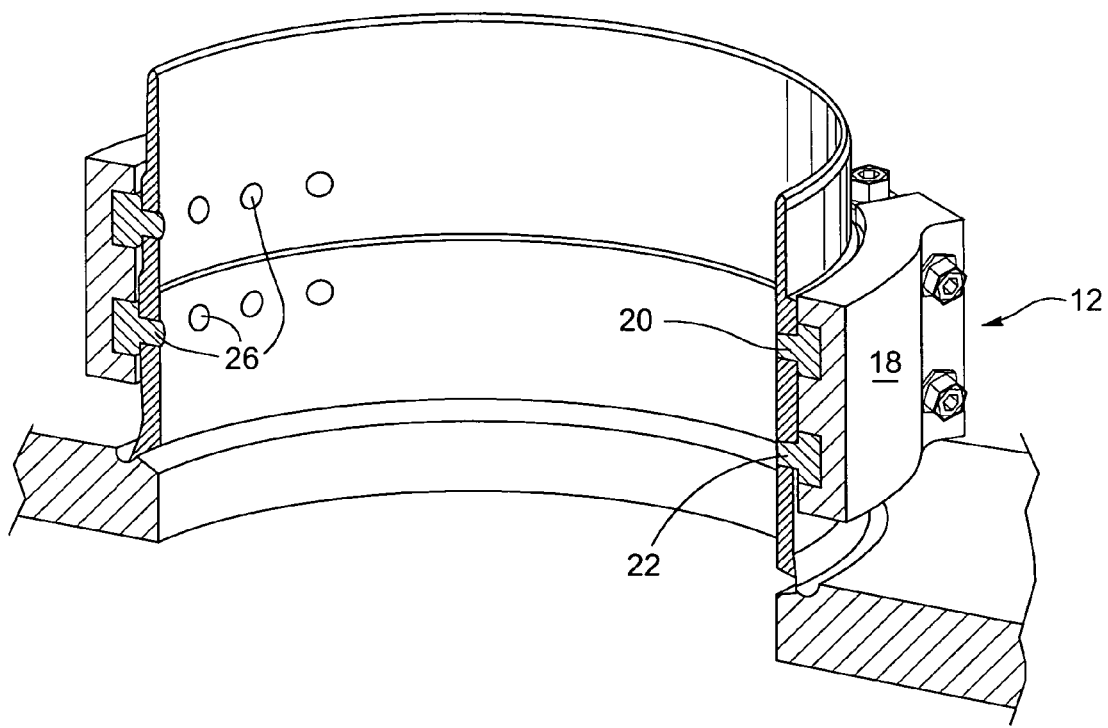
FIG. 4 is a half-section view showing the locking assembly of the clamp segments.
Figure 6:
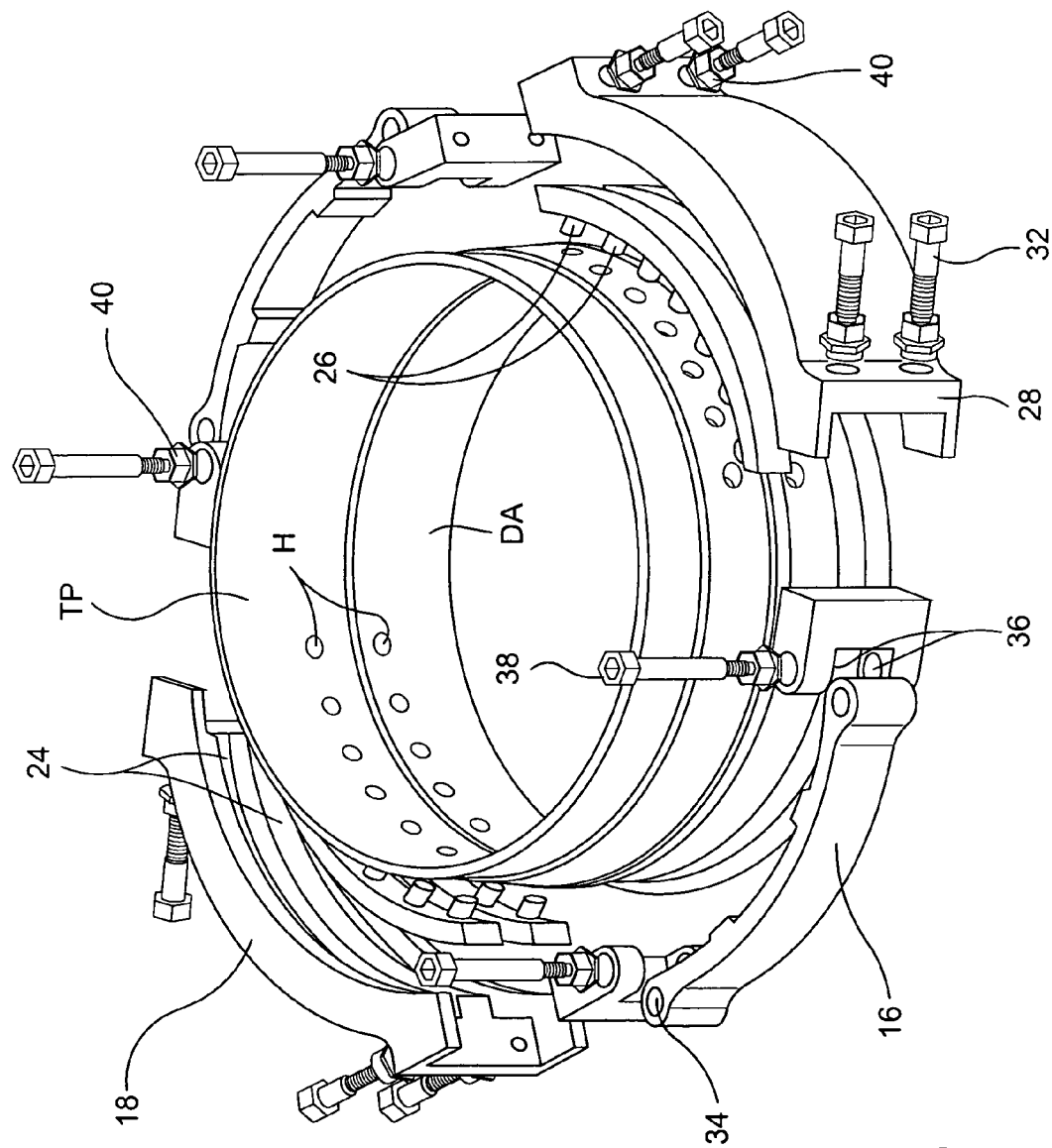
FIG. 6 is an exploded view of the clamp assembly.
Figure 7:
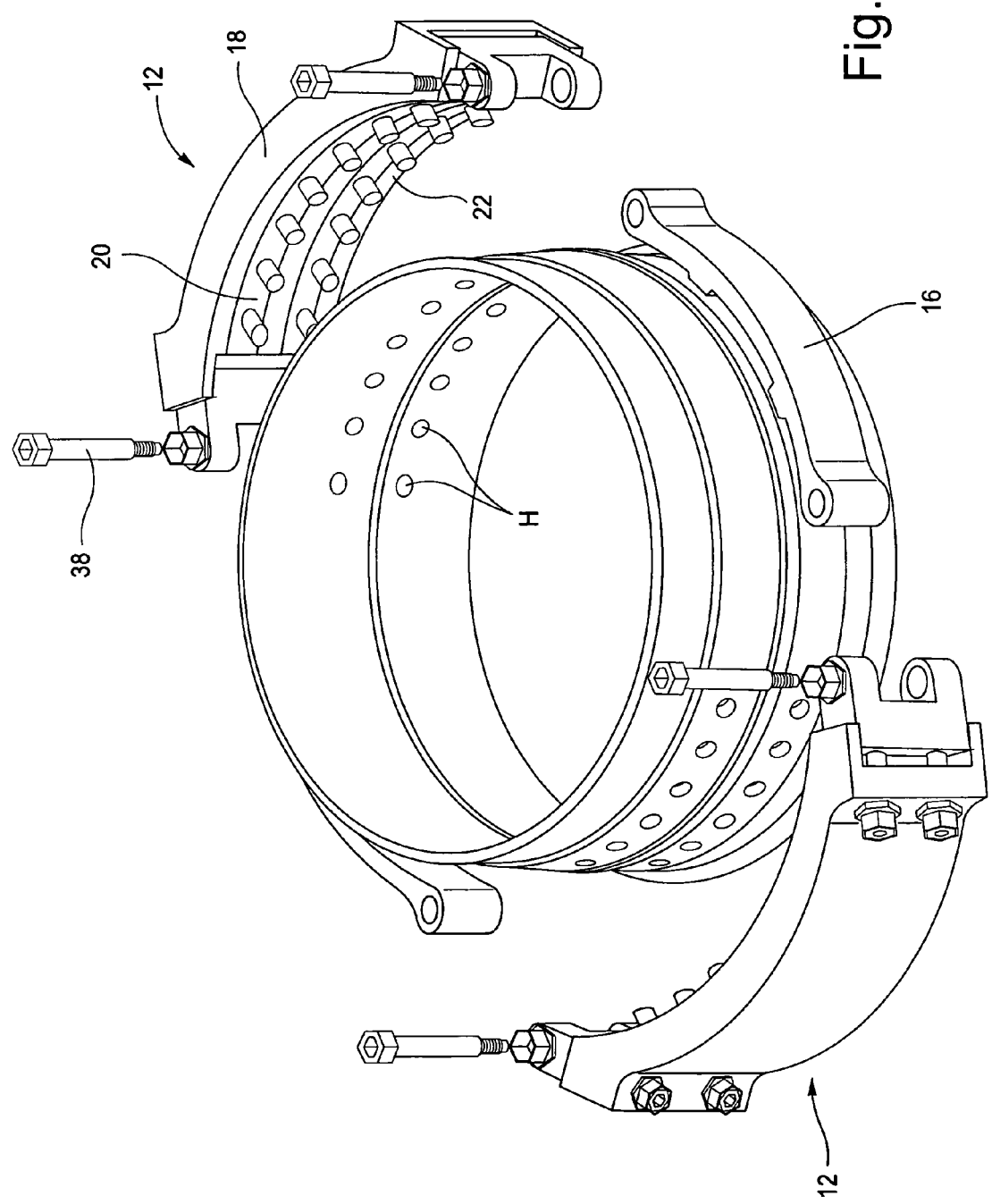
FIG. 7 illustrates the clamp installation process.

As shown in FIGS. 4, 6 and 7, the clamp segments 12 are comprised of a clamp body 18 and a pair of pin inserts, including an upper pin insert 20 and a lower pin insert 22. The clamp bodies 18 each include a pair of circumferential channels 24 on an inside surface thereof that are sized to receive the upper and lower pin inserts 20, 22. The pin inserts 20, 22 include a plurality of pins 26 engageable with corresponding holes H formed in the diffuser adapter or lower ring DA and the diffuser tailpipe TP. Preferably, the pins 26 are conically shaped, and the holes H formed in the diffuser adapter or lower ring and the diffuser tailpipe are correspondingly tapered.

The preferably conical pins and mating tapered holes are sized such that the pins seat in the tapered holes (i.e. the pin inserts and clamp bodies do not bottom-out or touch the diffuser when the clamp assembly bolts are tightened). As such, leakage of coolant is minimized, since the conical pins theoretically seal the tapered holes. Although cylindrical pins could be used, and the invention is not meant to be limited to conical pins per se, if the pins were cylindrical and they fit into cylindrical holes, there would need to be a clearance between the pins and holes in order to facilitate assembly. The radial clearance would therefore provide a leakage path at every pin-hole interface. In an attempt to minimize leakage, the conical pins and tapered holes are provided.

With continued reference to FIGS. 1 and 6, each of the clamp segments 12 includes a bolt collar 28 at each end thereof including at least one aperture 30 for receiving a bolt 32 engageable with a corresponding one of the swivel links 14.

Ends of the connecting bands 16 include openings 34 therein that are aligned between openings 36 in the swivel links 14. A pin 38 is fit through the aligned openings to secure the connecting bands 16 within the swivel link. Each of the bolts 32 and the pins 38 preferably also include crimp collars 40, 40 to ensure fastener retention.

Since the diffuser tailpipe TP and the diffuser adapter or lower ring DA are typically formed of different materials having different coefficients of thermal expansion, it is desirable to match the coefficients of thermal expansion between any interfacing components. As such, the upper pin insert 20, which is engageable with the diffuser tailpipe TP, is formed of a first material having a coefficient of thermal expansion substantially matching that of the diffuser tailpipe TP. Correspondingly, the lower pin insert 22, which is engageable with the diffuser adapter or lower ring DA, is formed of a second material having a coefficient of thermal expansion substantially matching that of the diffuser adapter or lower ring DA. In one exemplary arrangement, the first material of the upper pin insert is type 316 austenitic stainless steel, and the second material of the lower pin insert is inconel alloy 600.

In a similar context, since the clamp body 18 spans across both the diffuser tailpipe TP and the diffuser adapter or lower ring DA, it is desirable to engineer the thermal expansion of the clamp body to be substantially equivalent to the combined thermal expansion of the diffuser tailpipe TP and the diffuser adapter or lower ring DA at operating temperatures. As such, the clamp body 18 is formed of a material having a coefficient of thermal expansion that is intermediate between the coefficients of thermal expansion of austenitic stainless steel (upper section of the adapter and diffuser tail pipe) and inconel alloy 600 (lower section of the adapter or lower ring). In an exemplary embodiment of the invention, the material of the clamp body 18 is type XM-19 austenitic stainless steel (nitronic 50).

As a consequence, as the reactor heats up from ambient to operating temperature, the pins 26 expand in concert with the expanding holes H, and since the geometry of the pins 26 substantially matches the geometry of the holes H, leakage is minimized and thermal stresses are not imposed on clamp and diffuser components. Moreover, thermal expansion of the clamp body 18 is engineered to be equivalent to the combined thermal expansion of the jet pump tailpipe TP and adapter piece or lower ring. DA. As a result, thermal stresses at the bimetallic weld of the adapter are alleviated.

Figure 5:
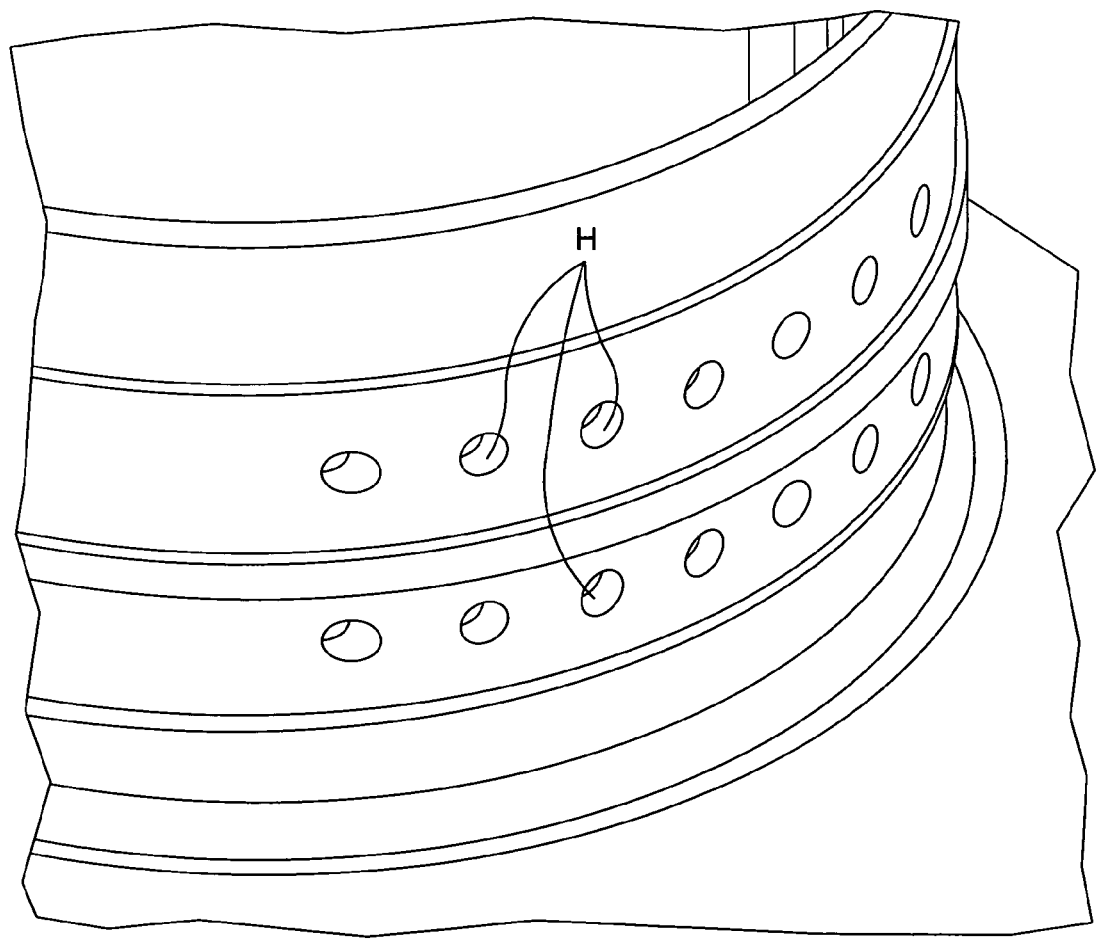
FIG. 5 shows the holes formed in the diffuser for engagement with the clamp assembly pin inserts.

The holes H, which are conical in a preferred exemplary embodiment of the invention, may be formed via electric discharge machining (EDM) in the tailpipe TP and the adapter or lower ring DA components, as shown in FIG. 5. The holes H include a row of holes in the tailpipe TP and a row of holes directly below in the adapter or lower ring DA. The center lines of the holes H in each row of holes are preferably equidistant from each other and lie in a common plane. Mirrored holes are also provided in the opposite side of the tailpipe TP and adapter or lower ring DA as shown in FIG. 6. The relative distance of the holes above and below the bimetallic weld is also a function of the coefficients of thermal expansion of the various materials. In an exemplary embodiment, the holes H are approximately ¾ (three fourths) inch in diameter with a total taper angle of 10°. Twenty-eight holes are shown, fourteen of which are machined in one side of the diffuser, and the other fourteen of which are machined in the other side of the diffuser. The holes H in any given side of the jet pump are preferably machined simultaneously in order to preserve the hole spacing above and below the weld line. The distance of these holes above and below the weld and the material selection of the clamp body components minimizes the introduction of additional thermal stress in the weld.

The repair clamp installation process is shown in FIG. 7. Once the holes H are machined in the jet pump diffuser, clamp components are installed. In a preferred exemplary embodiment, pre-assembled subassemblies including the clamp segments 12, swivel links 14, bolts 32, and bolt crimp collars 40, are installed onto each side of the jet pump diffuser PD such that the pins of the upper and lower pin inserts 20, 22 interface with the holes H in the jet pump diffuser. Subsequently, the connecting bands 16 are installed and secured to the swivel links 14 at each end of the connecting bands by virtue of the pins 38. The bolts 32 are then tightened sequentially to ensure proper fit-up and equal distribution of loads in the clamp components. Finally, the pin and bolt crimp collars 40 are crimped to ensure fastener retention.

The clamp assembly described herein serves to structurally repair/replace the weld connecting the jet pump adapter or lower ring to the jet pump tailpipe. Since the clamp assembly is designed to structurally replace the attachment bimetallic weld, it is not necessary that the existing weld be accessible for visual inspection after the repair clamp has been installed. The clamp assembly is remotely installable in the reactor. The clamp assembly is simplified in design and installation, resulting in a superior alternative for jet pump diffuser repair installations.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A clamp assembly for connecting a diffuser adapter or lower ring to a diffuser tail pipe of a jet pump diffuser in a boiling water nuclear reactor, the clamp assembly comprising:
   at least two clamp segments shaped generally corresponding to an exterior circumference of the diffuser;
   a swivel link affixed at each end of each of the clamp segments; and
   at least two connecting bands pivotably secured to the swivel links between the ends of the clamp segments,
   wherein the clamp segments each comprises a clamp body and a locking assembly cooperable with the clamp body and engageable with the diffuser adapter or lower ring and the diffuser tail pipe, the locking assembly including radially oriented pins directly engageable with corresponding holes formed in the diffuser adapter or lower ring and the diffuser tail pipe.

2. A clamp assembly according to claim 1, wherein each of the locking assemblies includes an upper pin insert and a lower pin insert secured to its respective clamp body, the upper and lower pin inserts including the pins directly engageable with the corresponding holes formed in the diffuser adapter or lower ring and the diffuser tail pipe.

3. A clamp assembly according to claim 2, wherein the clamp bodies comprise two circumferential channels on an inside surface thereof, the circumferential channels being sized to receive the upper and lower pin inserts.

4. A clamp assembly according to claim 2, wherein the pins on the upper and lower pin inserts are conical, and wherein the holes formed in the diffuser adapter or lower ring and the diffuser tail pipe are correspondingly tapered.

5. A clamp assembly according to claim 2, wherein the upper pin insert engageable with the diffuser tail pipe is formed of a first material having a coefficient of thermal expansion substantially matching that of the diffuser tail pipe, and wherein the lower pin insert engageable with the diffuser adapter or lower ring is formed of a second material having a coefficient of thermal expansion substantially matching that of the diffuser adapter or lower ring.

6. A clamp assembly according to claim 5, wherein the first material is type 316 austenitic stainless steel, and wherein the second material is inconel alloy 600.

7. A clamp assembly according to claim 2, wherein the clamp body is formed of a material having a coefficient of thermal expansion that is intermediate between a coefficient of thermal expansion of the diffuser tail pipe and a coefficient of thermal expansion of the diffuser adapter or lower ring.

8. A clamp assembly according to claim 7, wherein the material of the clamp body is type XM-19 austenitic stainless steel (nitronic 50).

9. A clamp assembly according to claim 1, wherein each of the clamp segments comprises a bolt collar at each end thereof, the bolt collars including at least one aperture for receiving a bolt engageable with a corresponding one of the swivel links.

10. A clamp assembly for connecting a diffuser adapter or lower ring to a diffuser tail pipe of a jet pump diffuser in a boiling water nuclear reactor, the clamp assembly comprising:

two clamp segments shaped generally corresponding to an exterior circumference of the diffuser, each clamp segment including a clamp body housing an upper pin insert and a lower pin insert, the upper and lower pin inserts including radially oriented pins directly engageable with corresponding holes formed in the diffuser adapter or lower ring and the diffuser tail pipe;

a swivel link affixed at each end of each of the clamp segments; and at least two connecting bands pivotably secured to the swivel links between the ends of the clamp segments.

11. A clamp assembly for connecting a diffuser adapter or lower ring to a diffuser tail pipe of a jet pump diffuser in a boiling water nuclear reactor, the clamp assembly comprising:

at least two clamp segments shaped generally corresponding to an exterior circumference of the diffuser;

a swivel link affixed at each end of each of the clamp segments; and at least two connecting bands pivotably secured to the swivel links between the ends of the clamp segments, wherein the clamp segments each comprises a clamp body and a locking assembly cooperable with the clamp body and engageable with the diffuser adapter or lower ring and the diffuser tail pipe, the clamp body including two circumferential channels on an inside surface thereof, and wherein the locking assembly is disposed in the circumferential channels facing the diffuser adapter or lower ring and the diffuser tail pipe.

* * * * *